(12) United States Patent
Hernandez Barrera

(10) Patent No.: US 11,224,199 B2
(45) Date of Patent: Jan. 18, 2022

(54) HYGIENIC FILTER AND DISPOSAL DEVICE

(71) Applicant: John Fernando Hernandez Barrera, Bogota (CO)

(72) Inventor: John Fernando Hernandez Barrera, Bogota (CO)

( * ) Notice: Subject to any disclaimer, the term of this patent is extended or adjusted under 35 U.S.C. 154(b) by 349 days.

(21) Appl. No.: 16/528,126

(22) Filed: Jul. 31, 2019

(65) Prior Publication Data

US 2020/0037572 A1 Feb. 6, 2020

Related U.S. Application Data

(60) Provisional application No. 62/713,320, filed on Aug. 1, 2018.

(51) Int. Cl.
*A01K 1/01* (2006.01)
*B07B 1/22* (2006.01)

(52) U.S. Cl.
CPC ............ *A01K 1/0114* (2013.01); *A01K 1/011* (2013.01); *B07B 1/22* (2013.01)

(58) Field of Classification Search
CPC ........... B07B 1/22; B07B 1/18; A01K 1/0107; A01K 1/011; A01K 1/0114; A01K 1/01; A01K 1/0125; A01K 23/005
(Continued)

(56) References Cited

U.S. PATENT DOCUMENTS 3,482,546 A 12/1969 Anderson
4,505,226 A 3/1985 Carlson
(Continued)

FOREIGN PATENT DOCUMENTS

JP 3069789 6/2000
KR 10-2018-0010459 1/2018

OTHER PUBLICATIONS

Patent Cooperation Treaty (PCT) International Search Report for application No. PCT/IB2019/056550, dated Jan. 23, 2020.
(Continued)

*Primary Examiner* — Yvonne R Abbott-Lewis
(74) *Attorney, Agent, or Firm* — Lott & Fischer, P.L.

(57) ABSTRACT

A hygienic filter and disposal apparatus comprising a main compartment a base platform, a front end, and a back end, and adapted to contain granular material and waste; a secondary compartment adapted to contain granular material; a door connecting the main compartment to the secondary compartment; and a filter element, comprising porous walls around a cavity and a first opening into said cavity, the walls adapted to filter waste out of the granular material; wherein the back end is proximate to the first opening at a first position where the front end and the back end of the base platform are level; wherein in a second position the front end is lifted higher than the back end and the granular material and waste are directed through the first opening into the cavity; wherein in the second position the filter element retains waste in the cavity and permits the granular material to fall through the porous walls into the secondary compartment; wherein in a third position the back end is higher than the front end and the door opens and directs the granular material into the main compartment; and wherein the device is adapted to sequence from the first position to the second position to the third position.

4 Claims, 14 Drawing Sheets

(58) Field of Classification Search
USPC ........ 119/166, 165, 161, 163, 168; 209/288, 209/235, 296, 406
See application file for complete search history.

(56) References Cited

U.S. PATENT DOCUMENTS

| | | | |
|---|---|---|---|
| 4,593,645 A * | 6/1986 | Dingier | A01K 1/011 119/165 |
| 4,870,924 A | 10/1989 | Wolfe | |
| 4,886,014 A | 12/1989 | Sheriff | |
| 4,934,317 A | 6/1990 | Pourshalchi | |
| 5,048,465 A | 9/1991 | Carlisi | |
| 5,178,099 A | 1/1993 | Lapps et al. | |
| 5,226,388 A | 7/1993 | McDaniel | |
| 5,394,833 A | 3/1995 | Glass | |
| 5,402,751 A * | 4/1995 | De La Chevrotiere | A01K 1/0114 119/166 |
| 5,507,252 A | 4/1996 | Ebert | |
| 5,517,947 A | 5/1996 | Christman | |
| 5,622,140 A * | 4/1997 | McIlnay-Moe | A01K 1/0114 119/166 |
| 5,642,814 A * | 7/1997 | Nelson | A01K 1/0114 119/166 |
| 5,673,648 A | 10/1997 | Ayle | |
| 5,678,508 A * | 10/1997 | Butzen | A01K 1/0107 119/166 |
| 5,823,137 A | 10/1998 | Rood et al. | |
| 6,126,015 A | 10/2000 | Haymaker | |
| 6,401,660 B1 | 6/2002 | Wolff | |
| 6,494,165 B2 * | 12/2002 | Asbury | A01K 1/0114 119/165 |
| 6,997,137 B1 | 2/2006 | Ricke | |
| 7,278,372 B2 * | 10/2007 | Colsky | A01K 1/0114 119/166 |
| 7,647,889 B2 * | 1/2010 | Horanoff | A01K 1/0114 119/163 |
| 8,109,238 B2 | 2/2012 | Casiana | |
| 8,381,687 B2 | 2/2013 | Tsengas | |
| 2011/0315084 A1 | 12/2011 | Miller | |
| 2013/0319340 A1 | 12/2013 | Bellini et al. | |
| 2017/0231190 A1 | 8/2017 | Brawn | |

OTHER PUBLICATIONS

Patent Cooperation Treaty (PCT) Written Opinion of the International Searching Authority (Korea) for application No. PCT/IB2019/056550, dated Jan. 23, 2020.

ScoopFree, ScoopFree Original Self-Cleaning Cat Litter Box, Aug. 2, 2018, https://www.chewy.com/scoopfree-original-self-cleaning-cat/dp/55638?utm_source=google-product&utm_medium=cpc&utm_campaign=hg&utm_content=ScoopFree&utm_term=&gclid=EAlaIQobChMI2qHc3qbM3AIVGXZeCh1U4wqEEAQYAiABEgLRYPD_BwE.

* cited by examiner

HYGIENIC FILTER AND DISPOSAL DEVICE

CLAIM OF PRIORITY

This application is being filed as a U.S. non-provisional patent application under 35 U.S.C. § 111(a) and 37 CFR § 1.53(b). This application claims priority under 35 U.S.C. 119(e) to U.S. provisional patent application Ser. No. 62/713,320 filed on Aug. 1, 2018, the contents of which are incorporated herein by reference.

FIELD OF INVENTION

The invention relates generally to a filtering waste from cat litter and in particular to a device and method for straining cat litter through a filter and bagging filtered material.

BACKGROUND OF THE INVENTION

Cats are among the most popular domesticated pets and often reside within the home of their owners. With regard to feces, a cat's instinct is to dig, deposit the feces, and then cover it. Although originally intended as a means for avoiding being stalked by other predators, the instincts of cats are still present in today's domesticated cats, although their environment has changed. Thus, cat litter boxes are often placed in a cat owner's home as a designated area for the cat to urinate and deposit its feces. Litter placed within the box emulates a natural environment for the cat and allows the cat to dig and cover its feces, as their instinct dictates.

As waste accumulates in the litter, the owner is tasked with removing and discarding the waste. The owner may be required to physically shovel out the waste or completely discard all the litter contained in the litter box. The physical shoveling of the waste may be obnoxious and off-putting, while the discarding of a box-full of litter will become expensive, as the litter must be constantly replaced when it could be reused.

A further disadvantage of currently designed litter boxes is that the owner must rake through the litter to find the waste that must be discarded. This may cause the owner to inadvertently allow waste to sit within the litter for long periods of time, causing the litter to develop an odor and the cat to stop using the litter box. In addition, the waste must be transferred to a secondary container, such as a garbage bag, to properly dispose of the waste. During this transfer process, waste or unclean litter may fall outside the litter box requiring the owner to further clean the surrounding areas of the litter box.

SUMMARY OF THE INVENTION

An object of the instant invention is to overcome the disadvantages of the current designs of cat litter boxes by providing a mechanical apparatus that allows a person to easily filter out waste, replace the litter, and cleanly discard the waste.

The apparatus of the current disclosure comprises several components, which, when used together, allow for the efficient and quick cleaning of cat litter. The first component is a main compartment. The main compartment provides an area where cat litter may be situated and a cat may go about using the litter to dig and cover its waste. The main compartment comprises a base platform, upon which the cat litter rests. The base platform comprises a front end and a back end.

The apparatus further comprises a filter element. The filter element is comprised of one or more porous walls, adapted for allowing the passage of a granular material, such as cat litter, while impeding the passage of unwanted material that is larger than pores of the one or more porous walls. The filter element also comprises an opening, which is substantially in line with the back end of the base platform at a first position. The opening permits the transfer of granular material and waste to the inside the filter element from the main compartment. In one embodiment of the present invention, the filter element may rotate about a longitudinal axis, causing filter element and the opening to move to a second position. In the second position, the opening faces away from the main compartment and a secondary compartment. In the second position, the opening of the filter element is not accessible from the main compartment.

By lifting the front end of the apparatus, gravity causes the litter situated in the main compartment to fall towards the back end. As the opening of the filter element is in line with the back end of the base platform, the litter travels through the opening and inside of the filter element. The litter then passes through the one or more porous walls of the filter element and into the secondary compartment, which is substantially below the filter element. Waste, such as feces and clumped litter, are unable to pass the one or more porous walls and remain inside of the filter element. The filter element may then be rotated to the second position, impeding the waste inside the filter element from returning to the main compartment.

The apparatus may subsequently be lifted from the back end and the filter element. The filtered litter, aided by gravity, travels from the secondary compartment back to the main compartment through a door integrated in the base platform. In it closed position, the top side of the door lays substantially flat relative to the base platform, whereby the presence of the door does not hinder the movement of litter travelling along the base platform towards the back end during the lifting process. The door is hinged, whereby, when the back end is lifted, the force of the litter, aided by gravity, presses against a bottom side of the door, causing the door to open and allow passage of the litter into the main compartment. Once all the litter in the secondary compartment has traveled through the door into the main compartment, the back end is lowered to an original position, causing the door to close, aided by gravity. A quick shake of the apparatus can evenly distribute the litter inside the main compartment.

In one embodiment, the filter element may be detached from the apparatus in order to discard the accumulated waste. The filter element may comprise a secondary opening on a distal end of the filter element. The secondary opening may be adapted for receiving a pre-packaged disposable container. Lifting an end of the filter element opposite the distal end causes the waste to fall into the pre-packaged disposable container. The pre-packaged disposable container may be tied off and discarded. The filter element is replaced and rotated to a first position. Thereby, the litter has been cleaned and ready for use by a cat once again.

Although the invention is illustrated and described herein as embodied in an cat litter apparatus, it is nevertheless not intended to be limited to only the details shown, since various modifications and structural changes may be made therein without departing from the spirit of the invention and within the scope and range of equivalents of the claims.

Disclosed is a hygienic filter and disposal apparatus comprising a main compartment comprising a base platform, the base platform comprising a front end and a back end, the main compartment adapted to contain granular material and waste; a secondary compartment, the secondary compartment adapted to contain granular material; the base platform comprising a door connecting the main compartment to the secondary compartment; and a filter element, comprising one or more porous walls around a cavity and a first opening into said cavity, the one or more porous walls adapted to permit the flow of granular material and to retain waste within the cavity; wherein the back end of the base platform is proximate to the first opening leading to the cavity of the filter element at a first position; wherein in the first position, where the front end and the back end of the base platform are substantially level, the main compartment is adapted to contain the granular material and any waste in the granular material; wherein in a second position, where the front end of the base platform is lifted higher than the back end of the base platform, the base platform is adapted to direct the granular material and waste through the first opening and into the cavity of the filter element; wherein at least in the second position the filter element retains waste in the cavity and permits the granular material to fall through the one or more porous walls into the secondary compartment; wherein in a third position, where the back end of the base platform is higher than the front end of the base platform, the door is adapted to open and direct the granular material from the secondary compartment into the main compartment; wherein the device is adapted to sequence from the first position to the second position to the third position.

These and other features and advantages will be apparent to those skilled in the relevant arts from a reading of the following detailed description, and a review of the appended drawings. It is to be understood that the foregoing summary, the following detailed descriptions, and the appended drawings are only explanatory and are not restrictive of various aspects claimed.

DETAILED DESCRIPTION OF THE INVENTION

While the present invention will be described more fully hereinafter with reference to the accompanying drawings, in which one or more embodiments of the present invention is shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
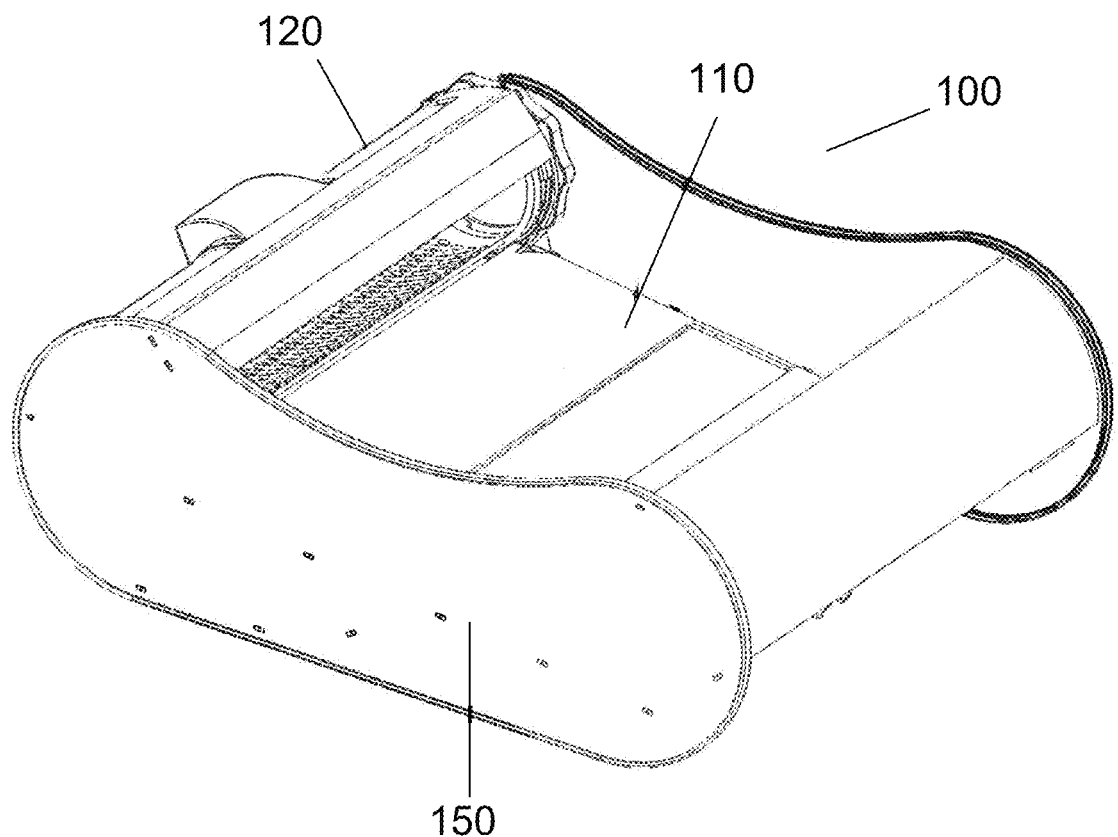
FIG. 1 is a perspective view of the apparatus according to one embodiment of the present disclosure.
Figure 2:
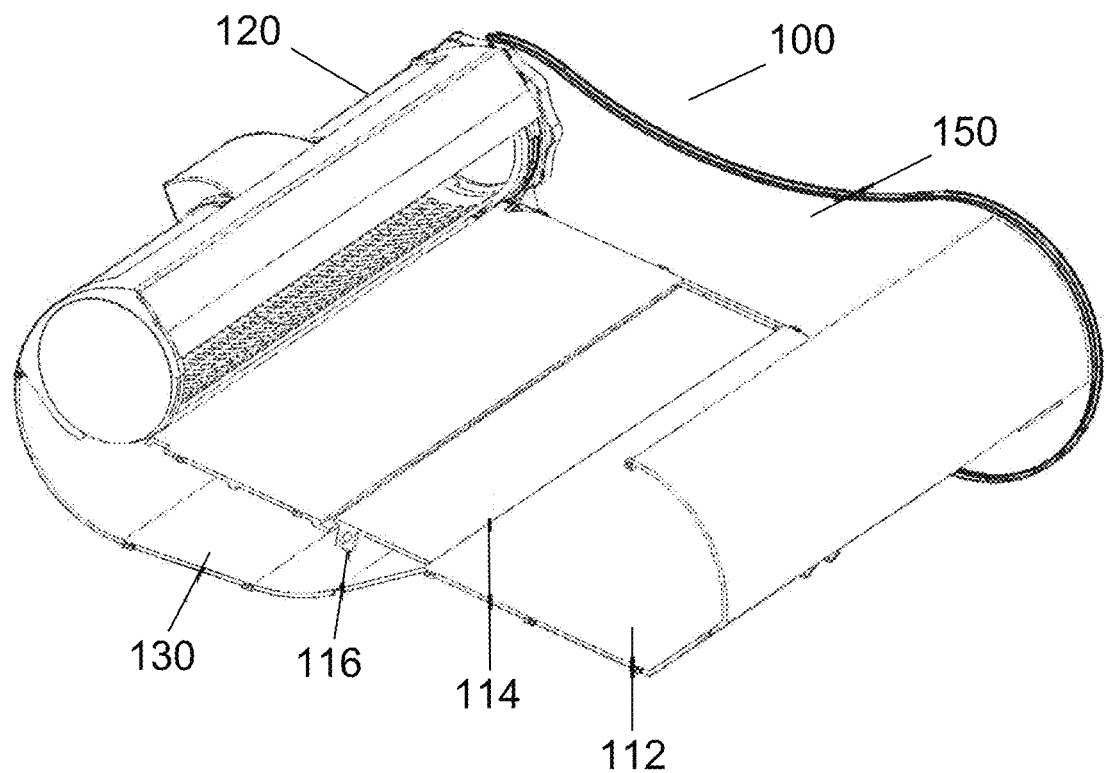
FIG. 2 is a perspective view of the apparatus, with a side panel removed to detail internal components, according to one embodiment of the present disclosure.
Figure 3:
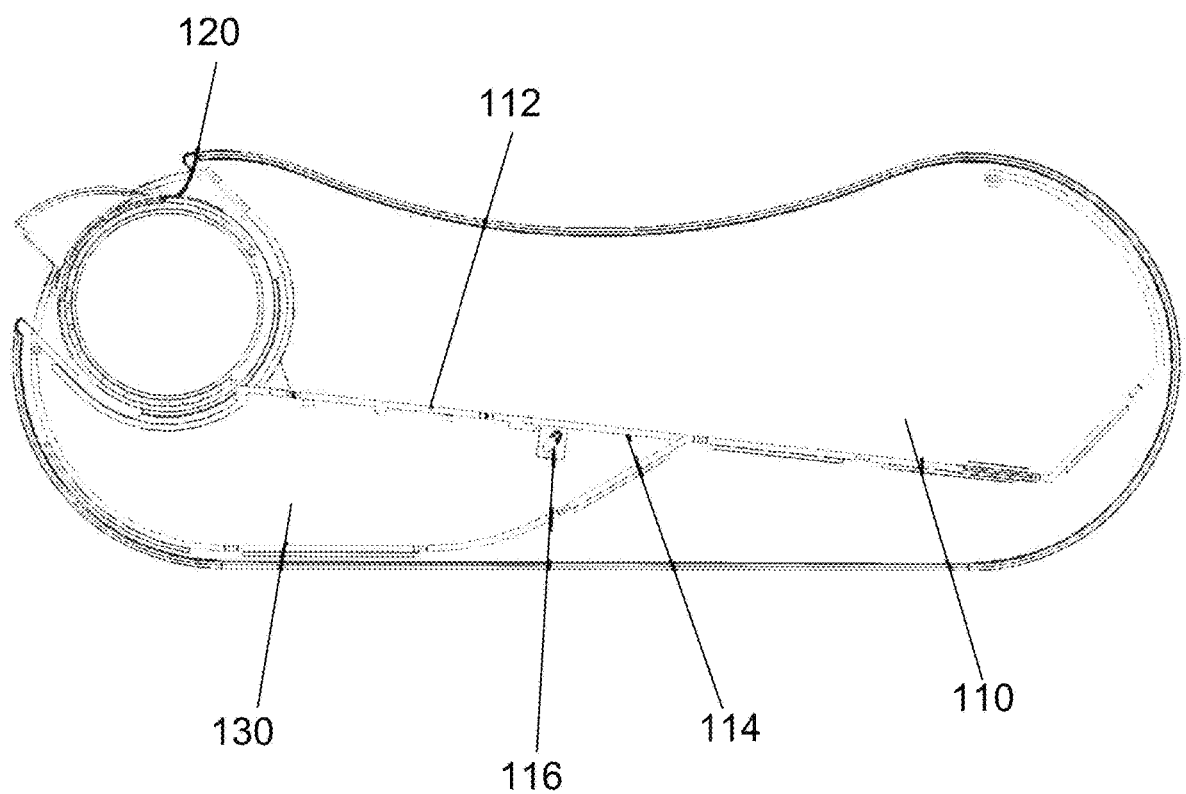
FIG. 3 is a side view of the apparatus according to one embodiment of the present disclosure.

Referring initially to FIG. 1 and FIG. 2, a first embodiment of a filtration apparatus 100 is shown. The apparatus 100 includes a main compartment 110, a filter element 120 and a secondary compartment 130. The apparatus may further comprise side panels 150. The main compartment 110 comprises a base platform 112 having a front end and a back end. The base platform comprises a door 114 that connects the main compartment 110 and the secondary compartment 130. As shown in FIGS. 2 and 3, the door 114 may operate through the use of one or more hinges 116. In a closed position, a top side of the door 114 may be substantially flush with a remainder of the base platform 112. The door 114 provides access for movement of material from the secondary compartment 130 into the main compartment 110. In one embodiment, the door 114 may partially open upon a force acting on a bottom side of the door 114, which is opposite the top side. However, the door 114 may be operated through other methods known in the art. In one embodiment, the door 114 may mounted on rails. In another embodiment, the door may be operated by a linkage assembly, which raises the door 114, while the top side of the door remains sustainably parallel with the base platform 112. Further, the door 114 may be operated manually, instead of requiring a force acting upon its bottom side.

In a first position, the main compartment 110 is adapted for holding a granular material. The granular material may be cat litter, sand, loose soil, gravel, or any other granular material adapted to receive waste or require filtering. In the first position, the front end and back end of the base platform 112 are substantially level. The granular material is housed within the main compartment 112 on top of the base platform 112 in the first position. In one embodiment of the invention, the side panels 150 may act as sidewalls of the main compartment and prevent the granular material from spilling outside the apparatus 100. In another embodiment, the base platform 112 may extend upwardly into sidewalls in a single integrated piece. In one embodiment, the main compartment may be substantially open to the surrounding environment, such that a cat may be able to enter the main compartment from all angles to use the cat litter within. However, in other embodiments, the main compartment may be an enclosed housing with an opening for access to the granular material or cat litter.

Figure 5:
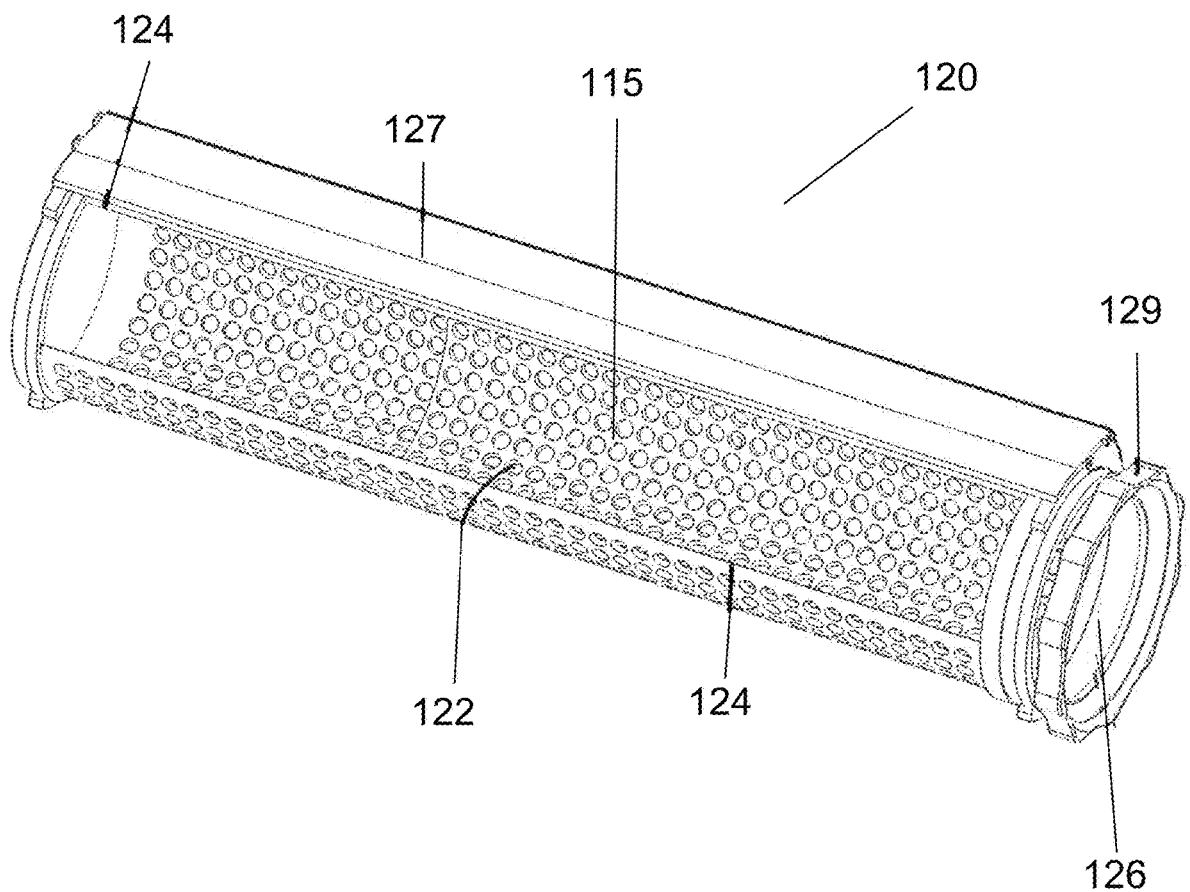
FIG. 5 is a perspective view of the filter element according to one embodiment of the present disclosure.
Figure 6:
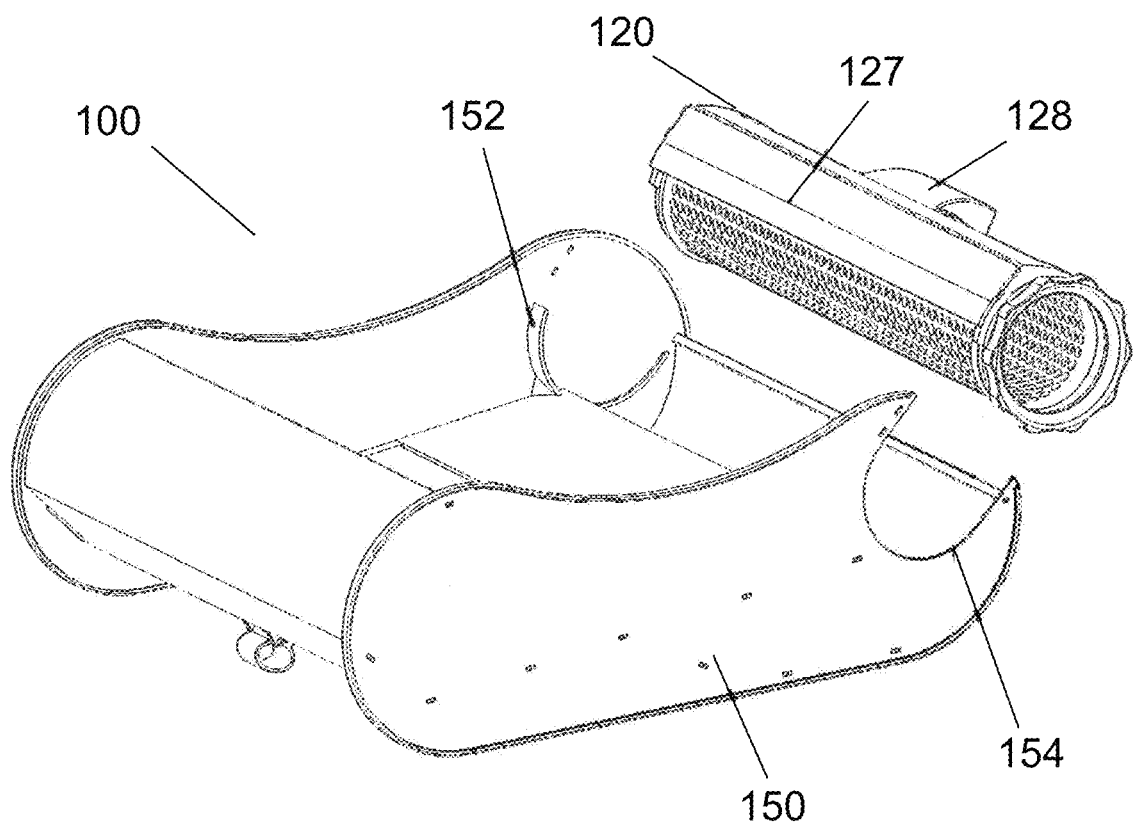
FIG. 6 is a perspective view of the apparatus with the filter element detached from the apparatus, according to one embodiment of the present disclosure.
Figure 7:
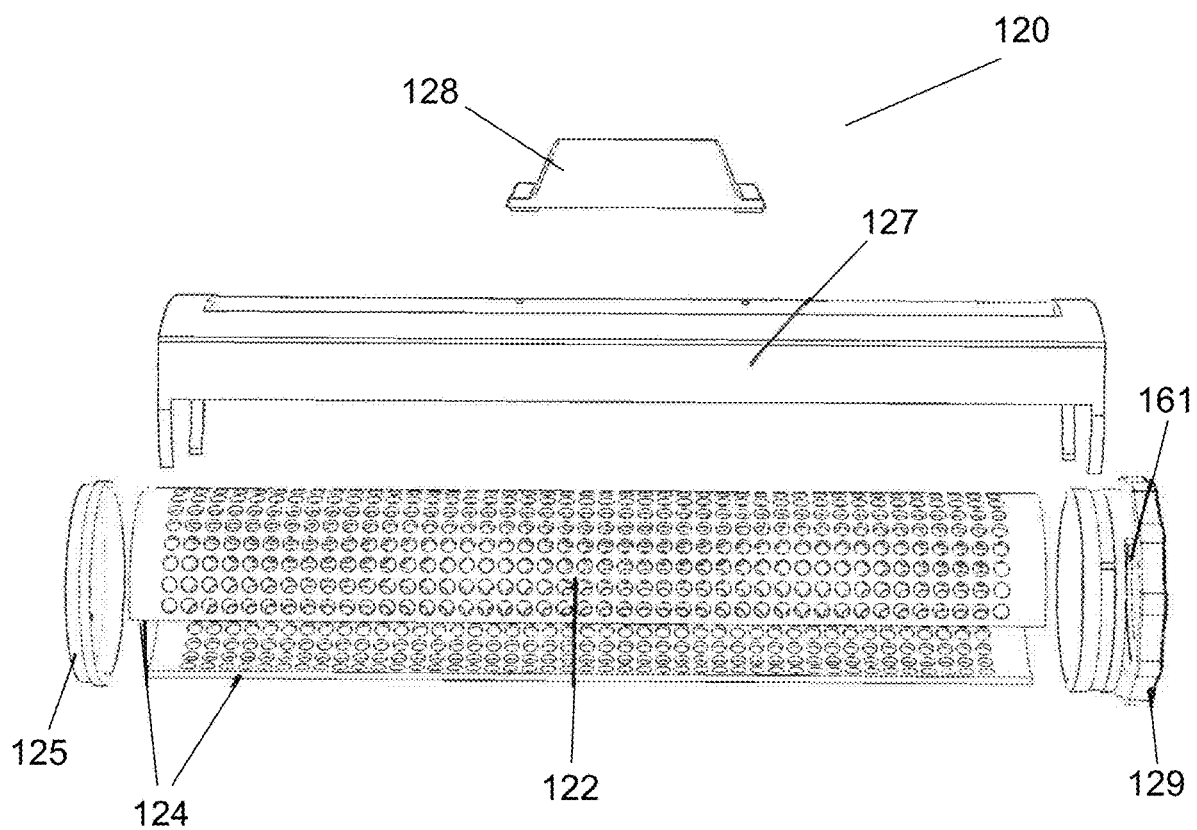
FIG. 7 is a front view of the exploded assembly of the filter element according to one embodiment of the present disclosure.

Referring next to FIGS. 5, 6 and 7, The filter element 120 is adapted for receiving and filtering the granular material, thereby removing unwanted material, such as waste and feces. The filter element 120 is comprised of one or more porous walls 122 proximate to or surrounding a cavity 115 within the filter element. The one or more porous walls 122 feature pores that are equal to or slightly larger than the size of individual particles of the granular material, whereby the granular material may easily pass through the pores. However, the pores are small enough to impede the passage of unwanted material, such as waste, feces, rocks, or clumped litter. The filter element 120 further comprises a first opening, surrounded by at least opening edges 124, whereby the granular material may enter the cavity 115 of the filter element 120 through the first opening. The first opening is substantially proximate to the back end of the base platform 112.

Figure 10A:
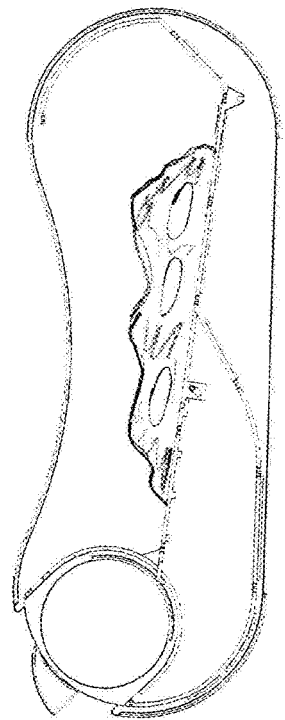
FIGS. 10A-10G illustrate a sequence of different positions that the apparatus of the present invention cycles in one embodiment.
Figure 10B:
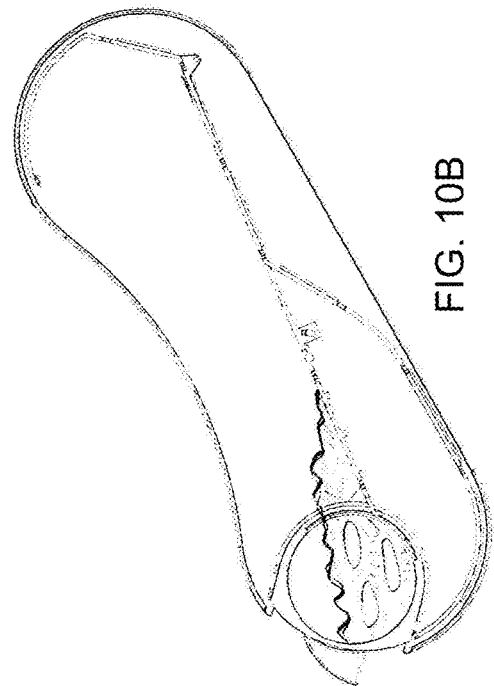
Figure 10C:
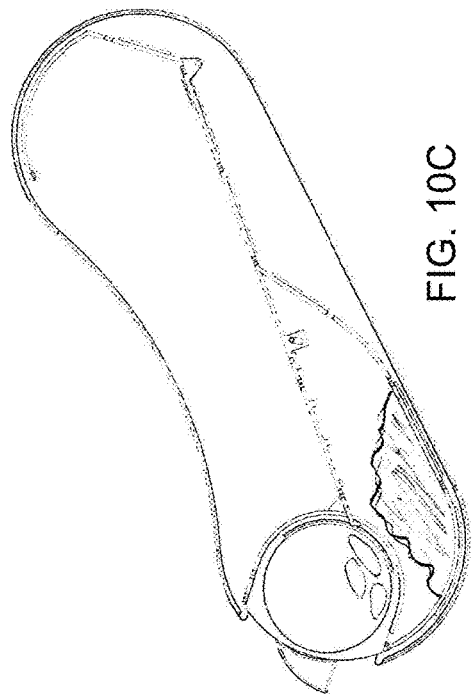

In operation, the apparatus sequences through a series of positions to separate waste deposited onto the granular material. The sequence of operations is shown in FIGS. 10A through 10G. Beginning with FIG. 10A, the apparatus 100 begins in its normal horizontal position with granular material and waste contained in the main compartment 110. As shown in FIG. 10B, the apparatus 100 is then be placed in a second position, where the front end of the base platform 112 is higher than the back end of the base platform 112. The base platform 112 in the second position is adapted to direct the granular material and waste toward the back end, through the first opening, and into the cavity 115 of the filter element. Thereafter, as shown in FIG. 10C, the granular material will fall through the one or more porous walls 122, while the waste is retained in the cavity 115 of the filter element 120.

The granular material that falls through one or more porous walls 122 enters the secondary compartment 130. Because the filter element 120 removed the unwanted waste contained in the granular material, the granular material in the secondary compartment 130 is substantially clean and waste free. The secondary compartment 130 may be situated below the filter element 120, such that the granular material passes through the filter element 120 and into the secondary compartment 130 simply by the force of gravity.

Figure 10D:
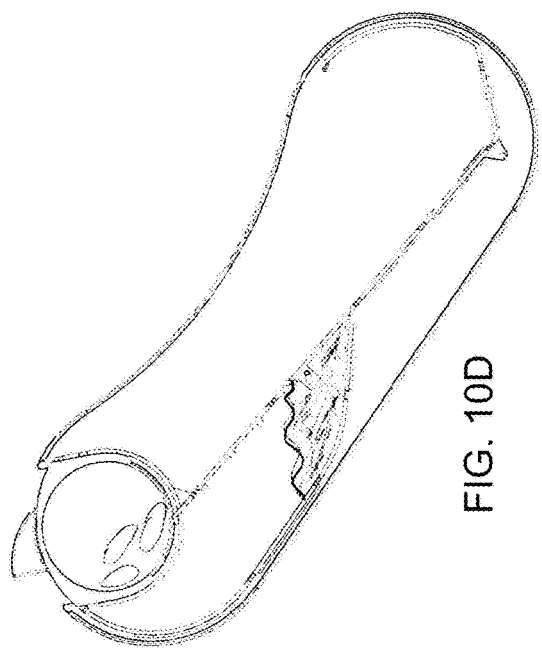
Figure 10E:
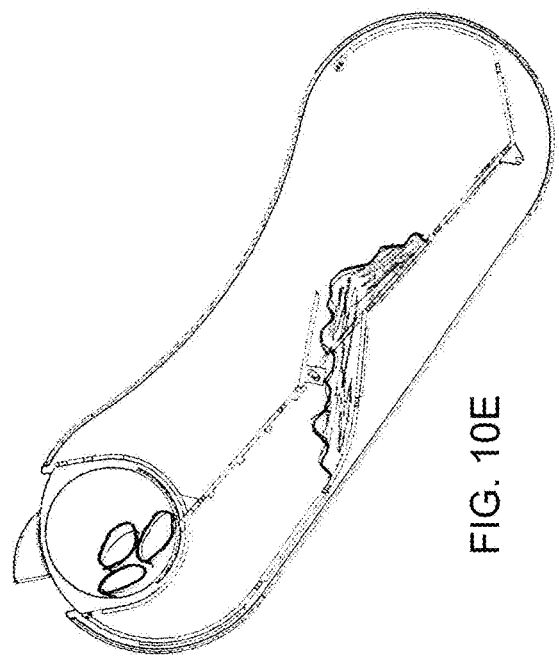
Figure 10F:
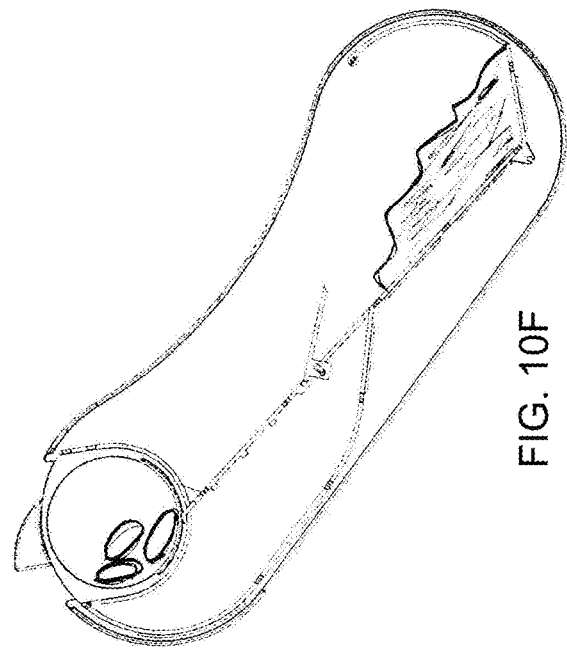
Figure 10G:
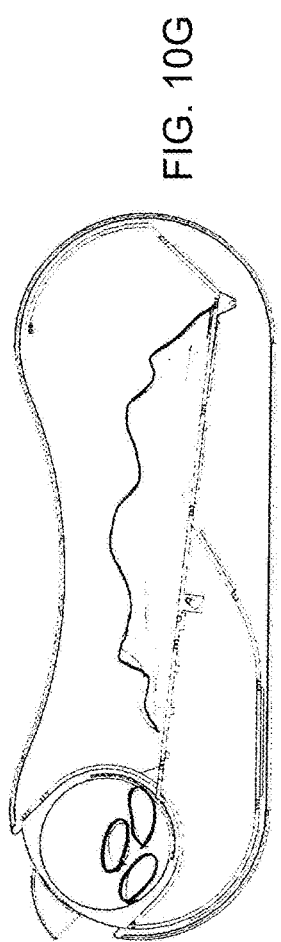

As previously discussed and further evidenced by FIG. 3, the filtered granular material may be transferred back from the secondary compartment 130 into the main compartment 110 via the door 114 of the base platform 112. As shown in FIG. 10D the apparatus may be placed in a third position, whereby the back end of the base platform 112 is higher than the front end of the base platform 112. In one embodiment, the secondary compartment 130 comprises a floor, which, in turn, comprises a ramp 132 leading up to the door 114. When the apparatus is in the third position, the granular material moves up the ramp 132 and towards the door 114 by the force of gravity. As shown in FIG. 10E, in one embodiment of the invention, the weight of the granular material against the bottom side of the door 114 causes the door 114 to swing upon the one or more hinges 116. The door 114 lifts to a height that allows the granular material to pass through an opening between the door 114 and the base platform 112. As shown in FIG. 10F, the granular material then continues to travel into the main compartment and towards the front end of the base platform 112. The front end of the base platform 112 may be substantially concave and comprise a cupped brim 118. Thereby, the granular material may be fully contained in the front end of the base platform 112 and not fall out of the apparatus 100, even when the apparatus 100 in the third position is substantially vertical. As shown in FIG. 10G, once the apparatus 100 is returned to its original position, the granular material is now free of waste and ready to receive additional waste, and all waste is retained within cavity 115.

Figure 4:
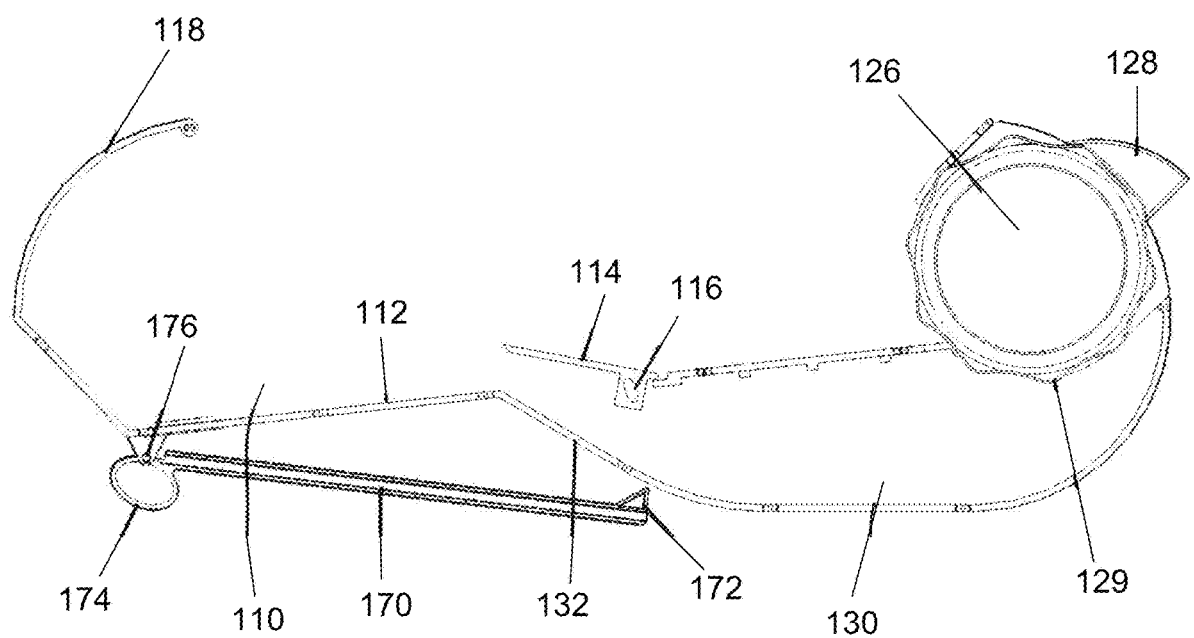
FIG. 4 is a side view of the apparatus, with side panels removed, showing an open door according to one embodiment of the present disclosure.

As shown in FIG. 4, in one embodiment of the present disclosure, the front end of the base platform 112 and the floor of the secondary compartment 130 may be manufactured as a single piece. As a singular piece, granular material moving from the secondary compartment 130 into through main compartment 120 through the opening caused by the lifting of the door 114 will not be caught in between gaps of any interconnected pieces. Trapped granular material may cause unpleasant odors to arise, as well as increase the possibility of bacteria forming.

As shown in FIG. 5, in one embodiment, the filter element 120 may be substantially tubular. The porous wall 122 of the filter may be manufactured as a single cylindrical wall, which substantially surrounds the cavity 115. The first opening, and therefore the opening edge 124, may extend along a longitudinal side of the porous wall 122. The filter element 120 may further comprise a second opening 126 at a distal end of the cylindrical porous wall 122. The filter element 120 may also comprise a filter holder 127 attached to the one or more porous walls 122. As demonstrated in FIG. 6, the filter element 120 is detachable from the remainder of the apparatus 100. The filter holder 127 may feature a handle 128 that allows a user to lift the entire filter element 120 out of the apparatus 100. In an unremoved state, the filter element 120 may rest upon rails 152 and/or an aperture 154 on an inner face of the side panels 150.

In one embodiment of the invention, the cylindrical porous wall 122 may be rotatable about a longitudinal axis, whereby the first opening is moved from an original position proximate the back end of the base platform 112 to a second position, substantially opposite the main compartment 110 and the secondary compartment 130. Thereby, the unwanted material filtered out of the granular material is secure in the cavity 115 of the filter element and may not fall back into the main compartment 120 or the secondary compartment 130 upon lifting of the apparatus 100. The opening may be substantially covered or closed by the filter holder 127 in the second position.

An exploded view of the filter element 120, according to one embodiment, is disclosed in FIG. 7. As shown, the filter element further comprises a knob 129 at the distal end of the filter element 120. The knob 129 is rigidly attached to the cylindrical porous wall 122 of the filter element, such that rotation of the knob 129 rotates the cylindrical porous wall 122 within the filter holder 127. The knob 129 may also have an opening substantially equal to the second opening of the filter element. A second distal end, opposite the second opening 129, may feature a cap 125, rigidly attached to the cylindrical porous wall 122. The cap 125 may engage the filter holder 127 and aid in the rotation of the cylindrical porous wall 122 by providing a surface on which the filter holder 122 may grasp firmly yet allow rotation.

After filtering the granular material through the one or more porous walls 122, the filter element 120 may be lifted out of the apparatus 100 for disposal of the unwanted material. In one embodiment, the unwanted material may be discarded by dumping the unwanted material into a wastebasket or similar waste-receptacle through the first opening. In another embodiment, the waste may be disposed via the second opening 126 on the distal end of the filter element. Thereby, the second opening 126 may be placed above or proximate the waste-receptacle and tilted until gravity causes the waste to exit the cavity 115 of the filter element 120 through the second opening 126.

Figure 8A:
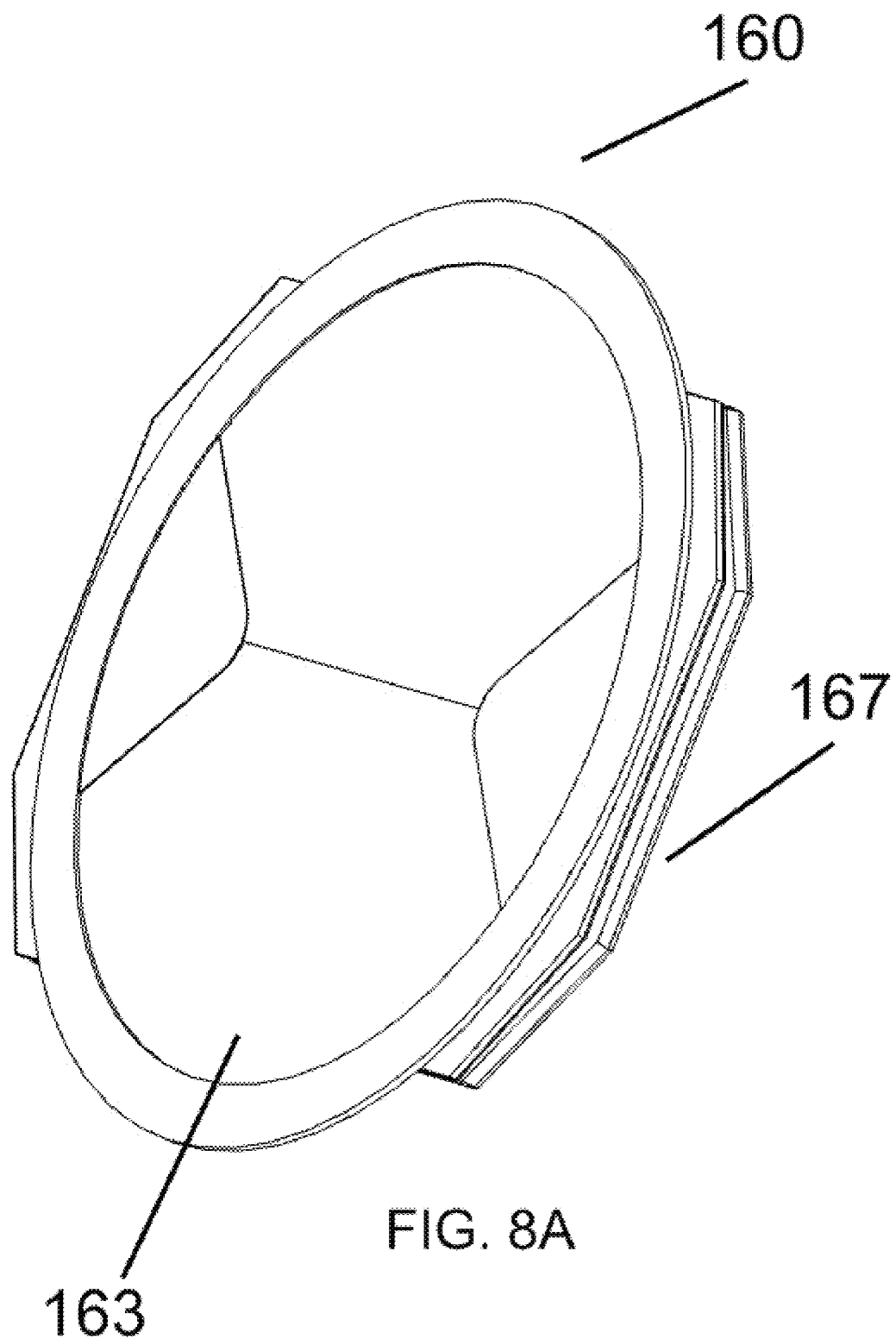
FIGS. 8A-8C illustrate different views of a pre-packaged disposable container, according to one embodiment of the invention.
Figure 8B:
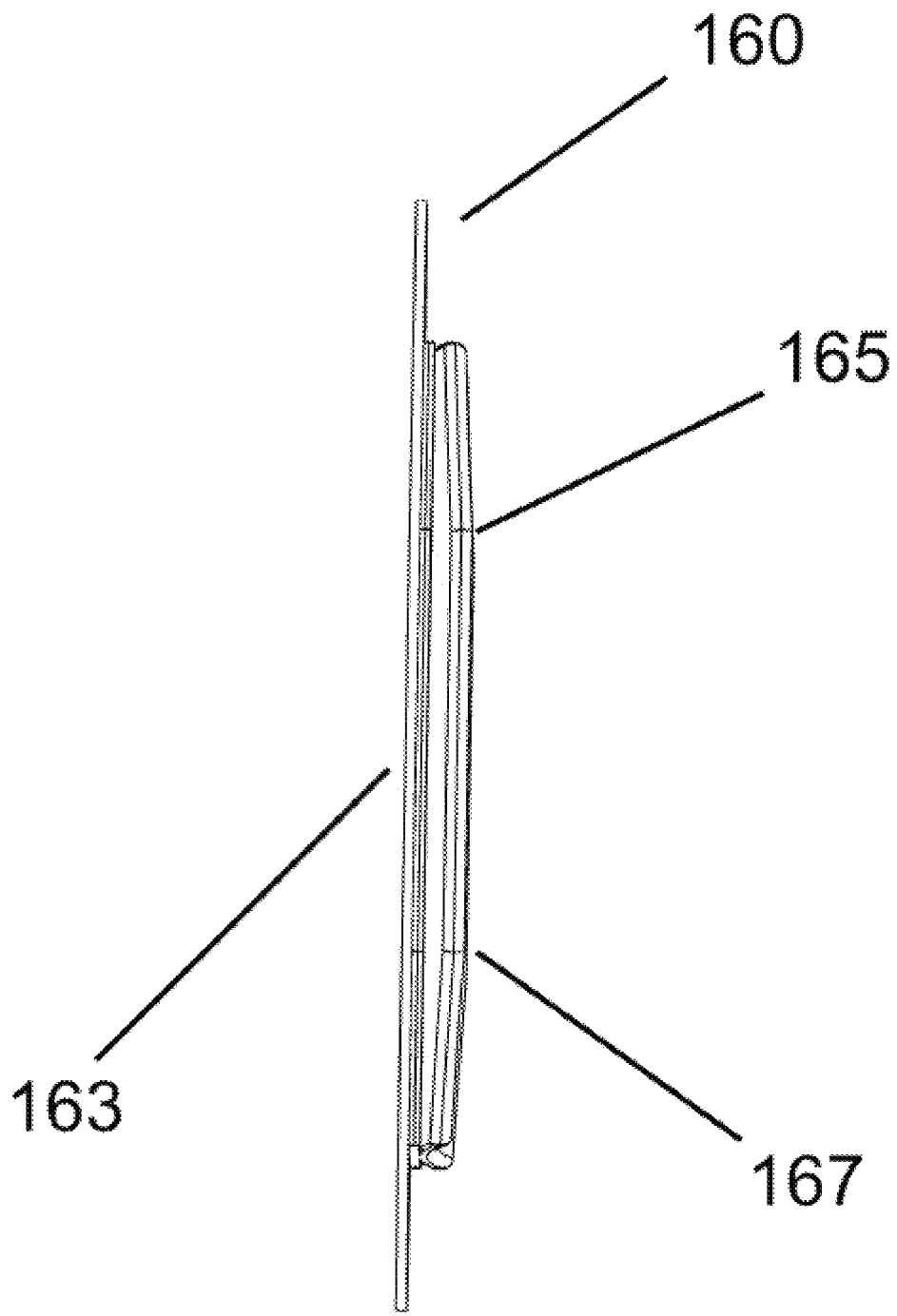
Figure 8C:
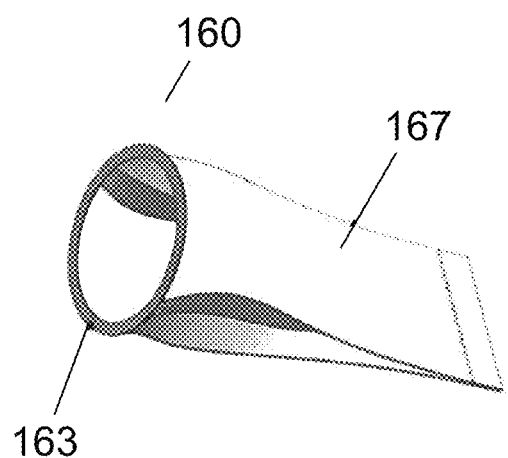

In another embodiment of the invention, a container is directly attached to the filter element 120 for disposal of the unwanted material. As shown in FIG. 7, the filter element may further comprise a groove 161 at the distal end proximate the second opening 126. The groove allows for temporary attachment of the container. In one embodiment of the disclosure, as shown in FIG. 8A-C, the container may be a disposal disk bag 160. The disposable disk bag 160 is a pre-packaged disposable container that is designed to receive the unwanted material. The disposable disk bag 160 is initially in a folded position, whereby the disposable disk bag 160 is substantially flat from a side perspective, as shown in FIG. 8B. The disposable disk bag 160 comprises a front side 163, which faces towards the cavity 115 of the filter element 120 when the disposable disk bag 160 is placed within the groove 161. The front side 163 of the disposable disk bag 160 is adapted for receiving the unwanted material from the filter element 120. Opposite the front side is a back side 165 of the disposable disk bag 160. The back side 165 features a folded receiving component 167. The receiving component 167 maintains a folded position until a force acts on the front side 163 of the disposable disk bag 160, thereby causing the receiving component 167 to expand outwardly, away from the front side 163. The receiving component 167 may be held in the folded position by the use of adhesive. In another embodiment, the receiving component may be held in the folded position by internal fibers that are broken upon an exertion of force upon the front side 163 of the disposable disk bag. However, the manner by which the receiving component 167 is maintained in a folded position is not limited by the above examples, and any method known in the art for maintaining a folded position may be employed within the disposable disk bag 160.

In one embodiment, the disposable disk bag 160 is placed within the groove 161, the granular material is filtered in accordance with the present disclosure, and the unwanted material is secured in the cavity 115 by rotating the knob 129. The user of the apparatus 100 then may detach the filter element 120 and substantially rotate the filter element 120 to a vertical position with the second opening 126 and the disposable disk bag 160 at a lower end. Gravity forces the unwanted material, which was filtered from the granular material and contained within the cavity 115, to fall through the second opening 126 and into the disposable disk bag 160. As shown in FIG. 8C, the disposable disk bag 160 is adapted to expand outwardly away from the filter element 120 and thereby receive the full amount of the unwanted material within the receiving component 167 of the disposable disk bag 160. The disposable disk bag 160 may further comprise a tying element to secure the unwanted material within the receiving component 167. In one embodiment, the tying element may comprise an exposed string on an outer face of the receiving component 167. The string may be tightly wrapped around the receiving component 167, thereby tying off the receiving component 167 and impeding the unwanted material from exiting the receiving component 167 through the front side 163 of the disposable disk bag 160. In one embodiment, the exposed string is a flexible wire that will substantially retain a position imposed upon the wire by a user. However, tying element of the disposable disk bag 160 is not limited to the use of a string, and it may incorporate any method known in art for securing material within a container, such as, but not limited to, cable ties, adhesives, or clips.

Figure 9A:
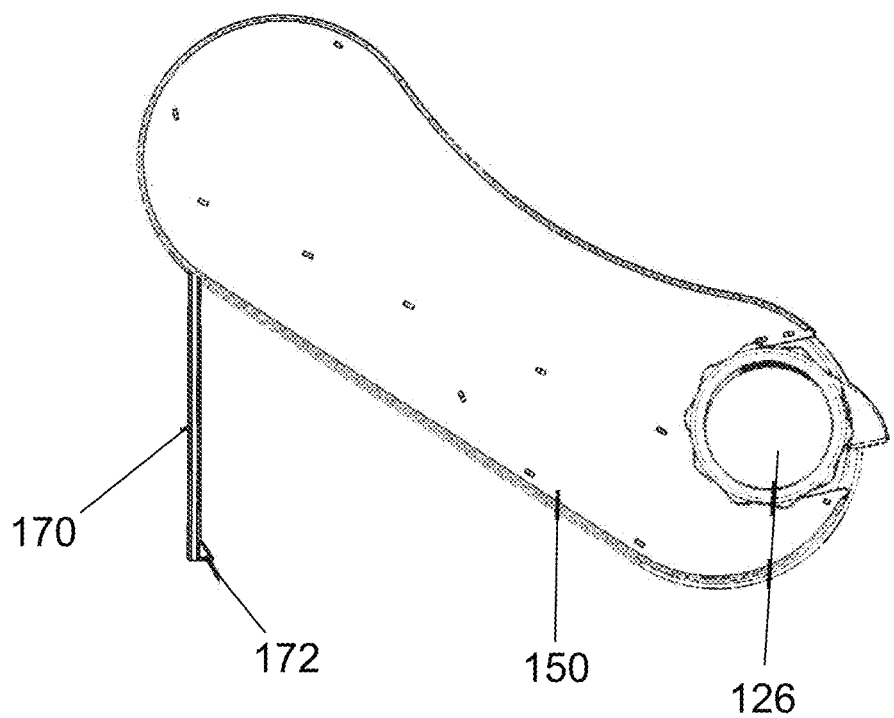
FIGS. 9A-9B illustrate different views of the apparatus with a support stand fully extended, according to one embodiment of the invention.
Figure 9B:
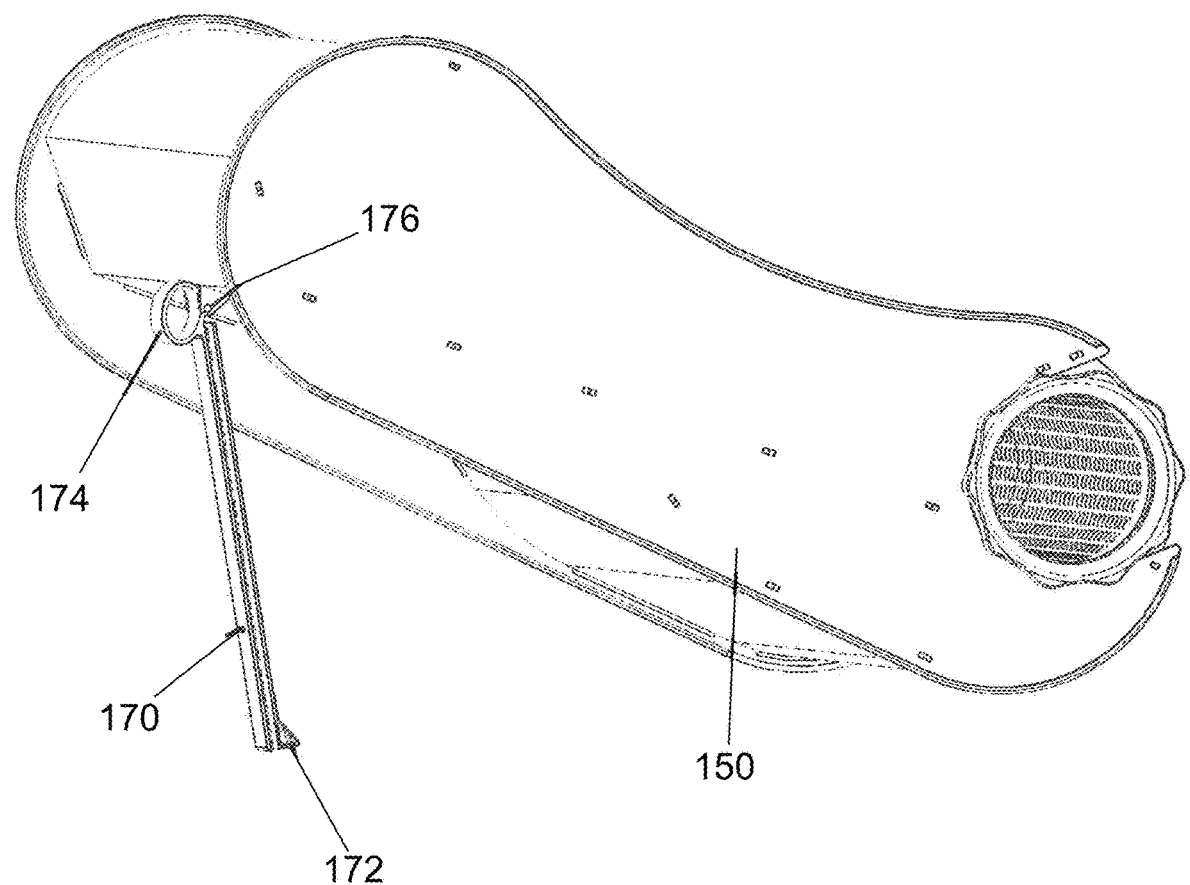

In another embodiment of the invention, the apparatus 100 may comprise a support stand 170. The support stand 170 is adapted for holding the apparatus 100 in the second position. When the apparatus 100 is in the second position (see FIGS. 10B and 10C), the granular material situated in the main compartment 110 falls through the first opening of the filter element and into the cavity 115. In one embodiment of the disclosure, as shown in FIGS. 9A and 9B, the support stand 170 is hinged proximate the front end of the base platform 112 on a bottom face of the base platform 112. In the first position, the support stand 170 extends from the front end of the base platform to the back end of the base platform and is substantially parallel with a surface upon which the apparatus 100 rests. In the first position, the support stand 170 may be completely hidden from view by the side panels 150. When the apparatus 100 is moved to the second position, a distal end of the support stand 170 proximate the back end of the base platform 112 may be lowered from an initial position to a lowered position. The support stand 170 allows the apparatus 100 to remain in the second position without assistance by a user, which may allow the user to the knob 129 to secure unwanted material within the cavity 115 of the filter element 120. Upon filtering the granular material through the cylindrical porous wall 122 and securing the unwanted material, the user may push the distal end of the support stand 170 back to the initial position, and the apparatus 100 may be returned to the first position. Although not shown, a second support stand may be used to maintain the apparatus 100 in the third position (see FIGS. 10D, 10E, and 10F), in the same manner as the support stand 170 maintains the apparatus 100 in the second position.

The support stand 170 may comprise a stand tip 172 at the distal end of the support stand 170 adapted to allow the support stand 170 to better engage the surface. The stand tip 172 may comprise a rubber material that increases friction and impedes the stand from sliding. The support stand may further comprise a grasp ring 174 proximate a hinge 176, wherein a user may manipulate the support stand 170 from its initial position to the lowered position, without the need to reach completely under the apparatus 100. The hinge 176 of the support stand 170 may further comprise a spring, whereby the spring forces the support stand 170 to hinge downward into the lowered position when the apparatus 100 is being moved from the first position to the second position. Although shown as a hinged element proximate the front end of the base platform 112, the support stand 170 may feature any element known in the art for maintaining the apparatus 100 in the second position, and the support stand 170 is not limited to a location near the front end of the base platform 112.

All components of the apparatus 100 may be manufactured from lightweight and non-stick material such that cleaning the apparatus 100 is easy and sanitary. Further, the components may be manufactured as multiple pieces for ease of shipping and manufacturing. For example, the side panels 150 may feature holes by which protrusions on edges of the base platform 112, the floor of the secondary compartment 130, and the door 114 may all snap into the holes of the side panels 150. The side panels 150 may also provide support for the apparatus 100, whereby a bottom edge of each side panel 150 is the only part of the apparatus 100 touching the surface upon which the apparatus 100 rests.

The present disclosure provides the advantage that a user of the apparatus 100 may avoid direct contact with the granular material at all times. Further, the use of the filter element 120 provides that a substantial amount of granular material, such as cat litter, may be reused after filtering out the unwanted material. Disposal of the unwanted material is also simplified, as the disposable disk bag 160 attaches directly to the filter element 120. The light weight and ease of use of the apparatus 100 also allow persons whom may normally have difficulty cleaning litter boxes to easily operate the apparatus 100.

Although the invention is described herein, various modifications and structural changes may be made therein without departing from the spirit of the invention and within the scope and range of equivalents of the claims.

I claim:

1. A hygienic filter and disposal apparatus comprising:
   a main compartment comprising a base platform, the base platform comprising a front end and a back end, the main compartment adapted to contain granular material and waste;
   a secondary compartment, the secondary compartment adapted to contain granular material;
   the base platform comprising a door connecting the main compartment to the secondary compartment; and
   a filter element, comprising one or more porous walls around a cavity and a first opening into said cavity, the one or more porous walls adapted to permit the flow of granular material and to retain waste within the cavity;
   wherein the back end of the base platform is proximate to the first opening leading to the cavity of the filter element at a first position;
   wherein in the first position, where the front end and the back end of the base platform are substantially level, the main compartment is adapted to contain the granular material and any waste in the granular material;
   wherein in a second position, where the front end of the base platform is lifted higher than the back end of the base platform, the base platform is adapted to direct the granular material and waste through the first opening and into the cavity of the filter element;
   wherein at least in the second position the filter element retains waste in the cavity and permits the granular material to fall through the one or more porous walls into the secondary compartment;
   wherein in a third position, where the back end of the base platform is higher than the front end of the base platform, the door is adapted to open and direct the granular material from the secondary compartment into the main compartment;
   wherein the device is adapted to sequence from the first position to the second position to the third position.

2. The apparatus of claim 1, wherein the filter element is substantially tubular.

3. The apparatus of claim 2, the filter element comprising a second opening at a distal end, wherein the first opening is along a longitudinal face and the filter element is adapted for rotation about a longitudinal axis.

4. The apparatus of claim 3, wherein the apparatus further comprises a container adapted for attachment with the second opening at the distal end of the filter element and to receive waste from the cavity of the filter element.

* * * * *